Nov. 24, 1964   R. H. CARLSON   3,158,047
MACHINE FOR MAKING HEADED ARTICLES
Filed July 6, 1959   9 Sheets-Sheet 1

INVENTOR
RAYMOND H. CARLSON
BY
BUCKHORN, CHEATHAM & BLORE
ATTORNEYS

Nov. 24, 1964

R. H. CARLSON 3,158,047

MACHINE FOR MAKING HEADED ARTICLES

Filed July 6, 1959

INVENTOR
RAYMOND H. CARLSON

BY
Buckhorn, Cheatham, & Blore
ATTORNEYS

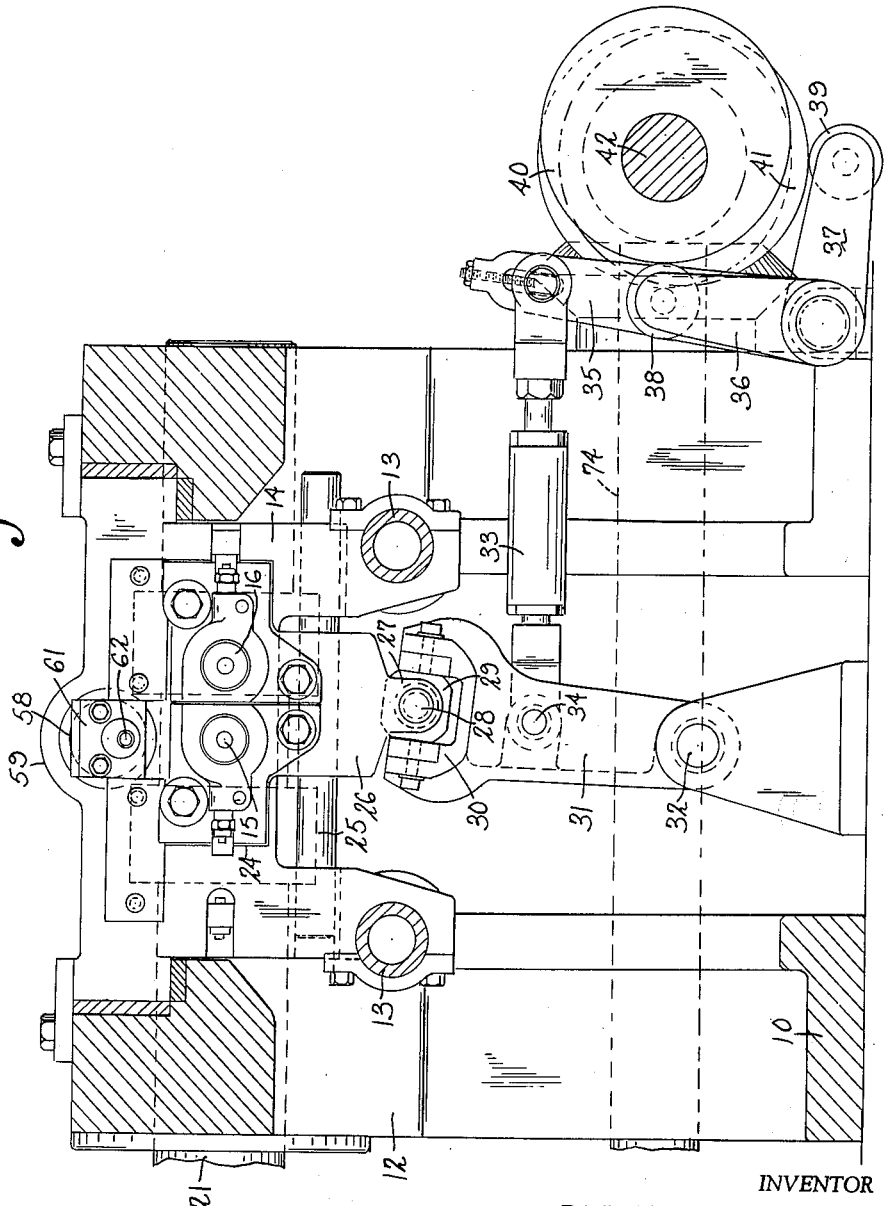

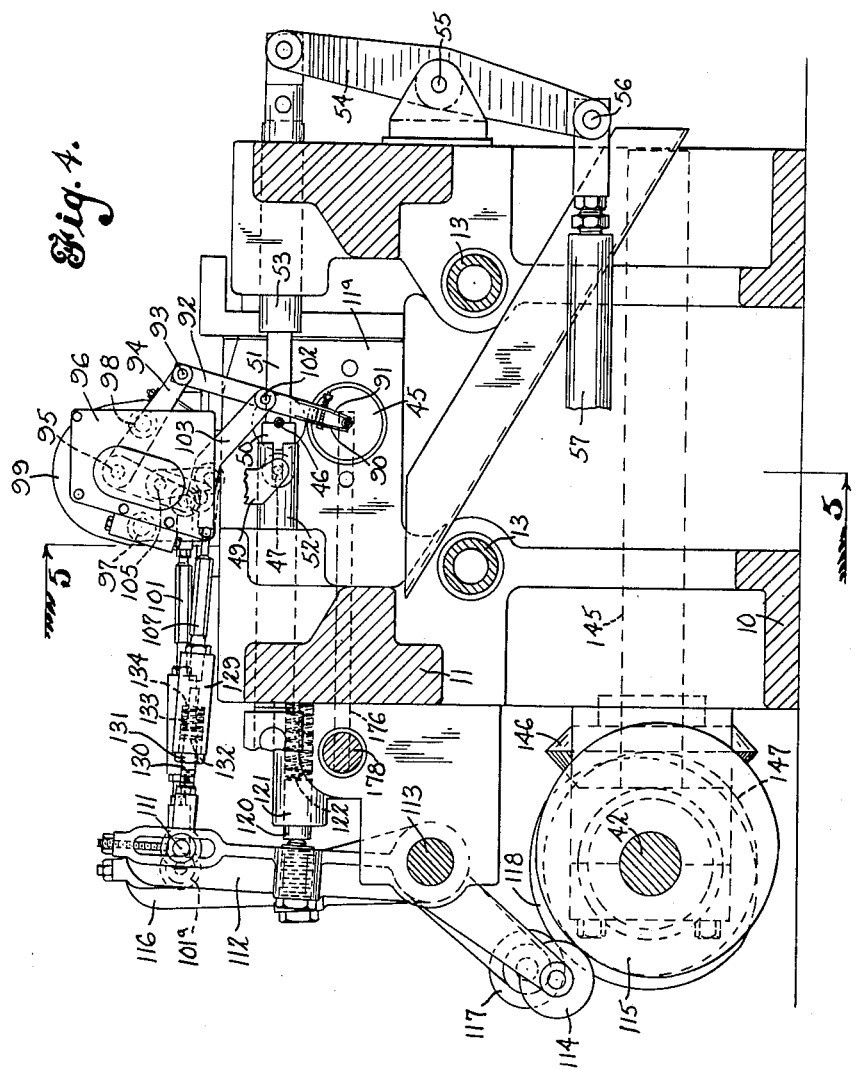
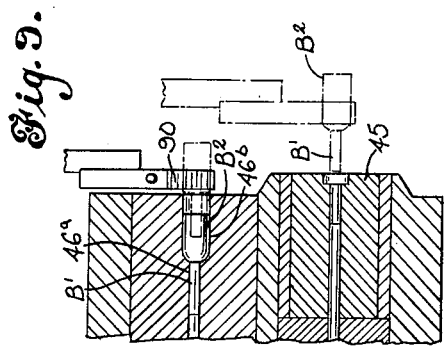

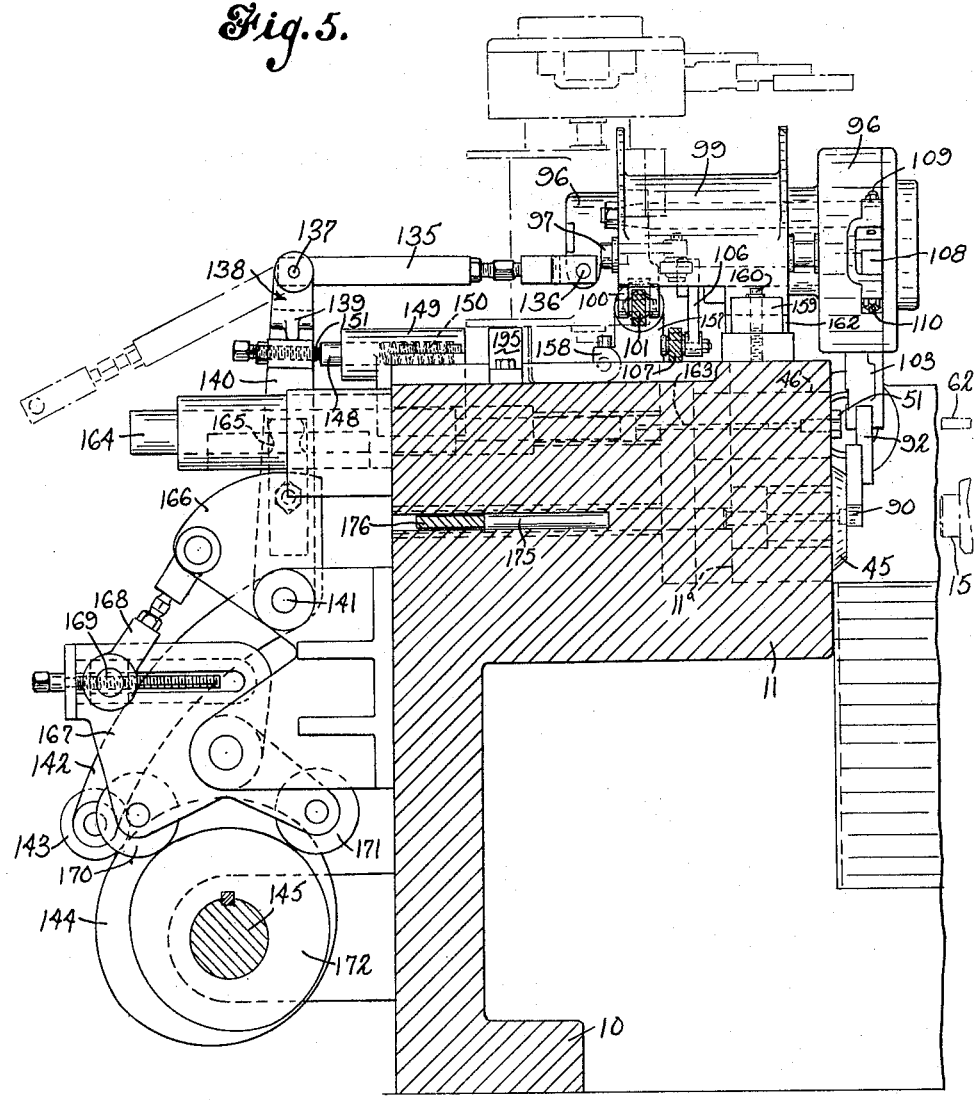

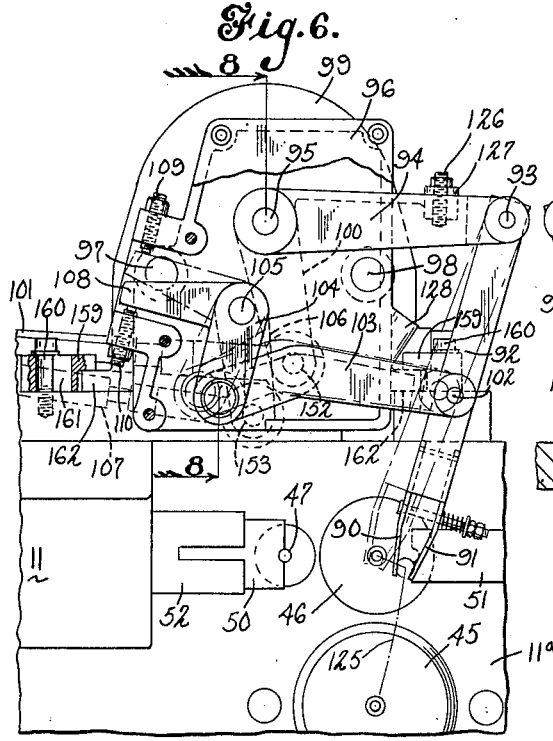

Nov. 24, 1964 R. H. CARLSON 3,158,047
MACHINE FOR MAKING HEADED ARTICLES
Filed July 6, 1959 9 Sheets-Sheet 7

INVENTOR
RAYMOND H. CARLSON
BY
BUCKHORN, CHEATHAM & BLORE
ATTORNEYS

INVENTOR
RAYMOND H. CARLSON

BY Buckhorn, Cheatham, & Blore
ATTORNEYS

Nov. 24, 1964     R. H. CARLSON     3,158,047
MACHINE FOR MAKING HEADED ARTICLES
Filed July 6, 1959     9 Sheets-Sheet 9

INVENTOR
RAYMOND H. CARLSON

BY *Buckhorn, Cheatham, & Blore*
ATTORNEYS

United States Patent Office 3,158,047
Patented Nov. 24, 1964

3,158,047
MACHINE FOR MAKING HEADED ARTICLES
Raymond H. Carlson, Rockford, Ill., assignor to Textron Industries, Inc., Rockford, Ill., a corporation of Delaware
Filed July 6, 1959, Ser. No. 825,363
14 Claims. (Cl. 78—17)

This invention relates to an apparatus for making metal articles, and particularly an article provided with a stem or shank and a head of relatively large cross-sectional size with respect to the shank or with respect to at least a part of the shank. This application is a continuation-in-part of my application Serial No. 703,554, filed December 18, 1957, now abandoned.

In the manufacture of articles of the type described where the head is of a size considerably larger than the shank or a part of the shank, it is difficult to form such articles in a header from rod or wire stock of the same size as the shank, and it is, therefore, necessary to reduce the cross-sectional size of the stock as well as to head the workpiece. In the present instance, this reduction is obtained by an extrusion operation so that the workpiece which is cut off from a length of rod or wire is first extruded to reduce the cross-sectional size of a part thereof and is then headed. If desired, all that part of the blank which is to form the shank of the finished product may be reduced in cross section, leaving a larger end portion to be headed.

The heading may be performed in one or a series of operations, there being two heading blows effected in the example illustrated in the application.

In heading machines of the usual construction, the workpiece is cut from a length of stock and carried by the knife or cutting element to a knock-out station where the workpiece is ejected from the knife into transfer fingers by which it is transferred to a die for the heading operation or operations. According to the present apparatus an extruding die is provided at the knock-out station, and an extruding or impact punch is provided at this station to drive the workpiece into an extruding die positioned opposite the knock-out station.

In prior operations, where extrusion has been effected, the reduction in cross-sectional size of the blank has been relatively small. According to the present invention, reductions as great as 25 to 70 percent of the cross sectional area of the blanks is effected and the invention is particularly concerned with reductions of this magnitude.

After driving the workpiece into the die the impact punch is then caused to advance to its furthermost forward position to perform the extruding operation. This punch is then retracted and the workpiece, after the extruding operation has been effected, is ejected from the die into the transfer fingers to be carried thereby to the heading die. It will be seen, therefore, that whereas in previous operations the workpiece is ejected from the knife or cutter mechanism into the transfer fingers, an intermediate operation is performed in the present process, this being the extruding operation, and only after this operation has been effected is the workpiece delivered to the transfer fingers for transfer to the heading die.

When a two-blow header is employed, as illustrated herein, it will be understood that the gate which carries the two punches must be advanced twice each time a new blank is fed to the machine. Similarly in the present instance, as the extrusion operation is effected by one blow of the extruding or impact punch, the latter will be advanced once only during two advances of the gate. Provision is, therefore, made for driving both the impact punch and the gate from the main shaft of the machine in timed relation to each other so that the gate is advanced twice as often as the punch.

Also, as illustrated, the extruding punch is mounted upon the gate to reciprocate relatively thereto although actuated in its movements independently from the gate. As illustrated, the impact punch is provided in a vertical plane substantially centrally between the arms of a double pitman by which the gate is driven.

One of the novel features of the present invention is the construction and operation of the transfer mechanism whereby the transfer fingers which receive the workpiece are not only moved in a direction generally transverse to the next, but are also moved in a direction axially of the dies in order to properly receive the workpiece as one die and position it in the other as will be hereinafter explained.

In addition, the entire transfer mechanism is hinged to the bed or frame of the machine so that it may be swung upwardly about this hinge so as to be accessible for adjustment.

One object of the invention is to provide a new and improved apparatus for making metal articles, particularly articles provided with a head and shank, the latter being of relatively small size in cross section as compared to the head.

A further object of the invention is the provision of a new and improved apparatus for making a headed blank from rod or wire stock, and particularly one wherein the workpiece is reduced in cross-sectional size by extrusion or similar processes before being headed.

Another object of the invention is to provide, in an apparatus for making a headed blank, a transfer mechanism which may be swung upwardly to an inoperative position above the die bed while maintaining the connection to the transfer fingers to actuate the same, whereby a template having die stations thereon may be secured in operative positions with relation to the transfer mechanism to facilitate the adjustment of the latter.

Still another object of the invention is to provide an apparatus wherein a workpiece consisting of a length of rod or wire stock may, at different stations in the same machine, be extruded so that at least a part thereof is reduced in cross-sectional size to form a shank and thereafter headed whereby a head may be formed considerably larger in cross-sectional size than the reduced portion of the shank.

A still further object of the invention is to provide a header or upsetting machine with means for cutting a workpiece from a length of rod or wire stock, with means for ejecting the workpiece from the cutters into an extrusion die, wherein by the action of a suitable punch the workpiece is extruded to reduce the cross-sectional size of a part thereof, and with means for thereafter delivering the workpiece to a heading die wherein a head is formed on the extruded blank.

To these and other ends the invention consists in the novel features and combinations of parts to be hereinafter described and claimed.

In the accompanying drawings:

FIG. 3 is a transverse sectional view on line 3—3 of FIG. 1;

FIG. 4 is a transverse sectional view on line 4—4 of FIG. 1;

FIG. 5 is a partial longitudinal sectional view on line 5—5 of FIG. 4;

FIG. 6 is a front elevational view of the die bed and transfer mechanism;

FIG. 7 is a rear elevational view of the transfer mechanism shown in FIG. 6;

FIG. 8 is a sectional view on line 8—8 of FIG. 6;

FIG. 9 is a sectional view through the extruding and heading dies;

FIG. 14 is an end view of the safety mechanism, looking toward the right on FIG. 12; and FIG. 15 is an elevational view of the safety mechanism taken from the side opposite that shown in FIG. 12.

Figure 2:
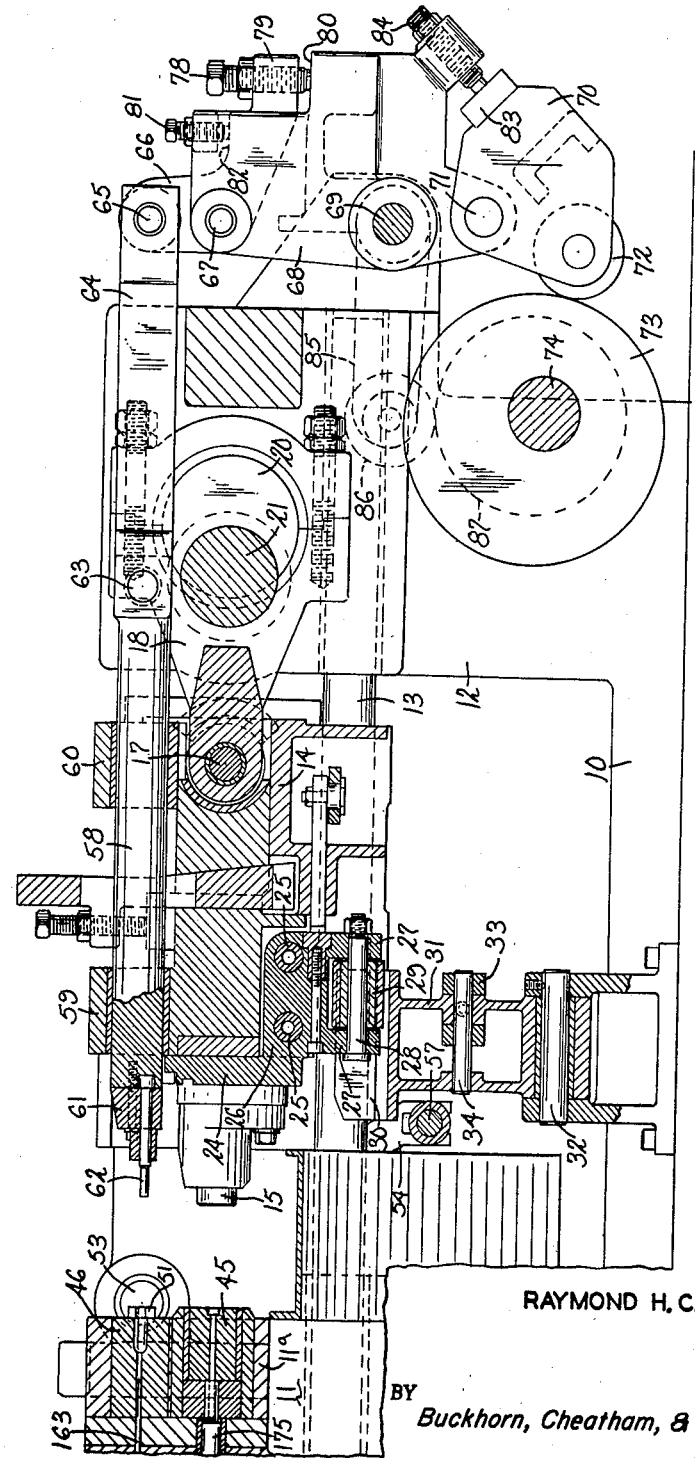
FIG. 2 is a longitudinal sectional view on line 2—2 of FIG. 1.

To illustrate a preferred embodiment of the invention there is shown in the drawings a heading or upsetting device comprising a bed or frame 10 having an upstanding portion 11 upon which is carried a die block 11ª at the forward end thereof and having an upstanding portion 12 adjacent the rear end of the frame. In the members 11 and 12 are slidably supported a pair of rods 13, to which rods are secured the gate 14 (FIGS. 2 and 3). Upon this gate are supported a pair of heading punches 15 and 16, which punches are mounted for sliding movement transversely of the direction of travel of the gate as will be later explained.

Figure 1:
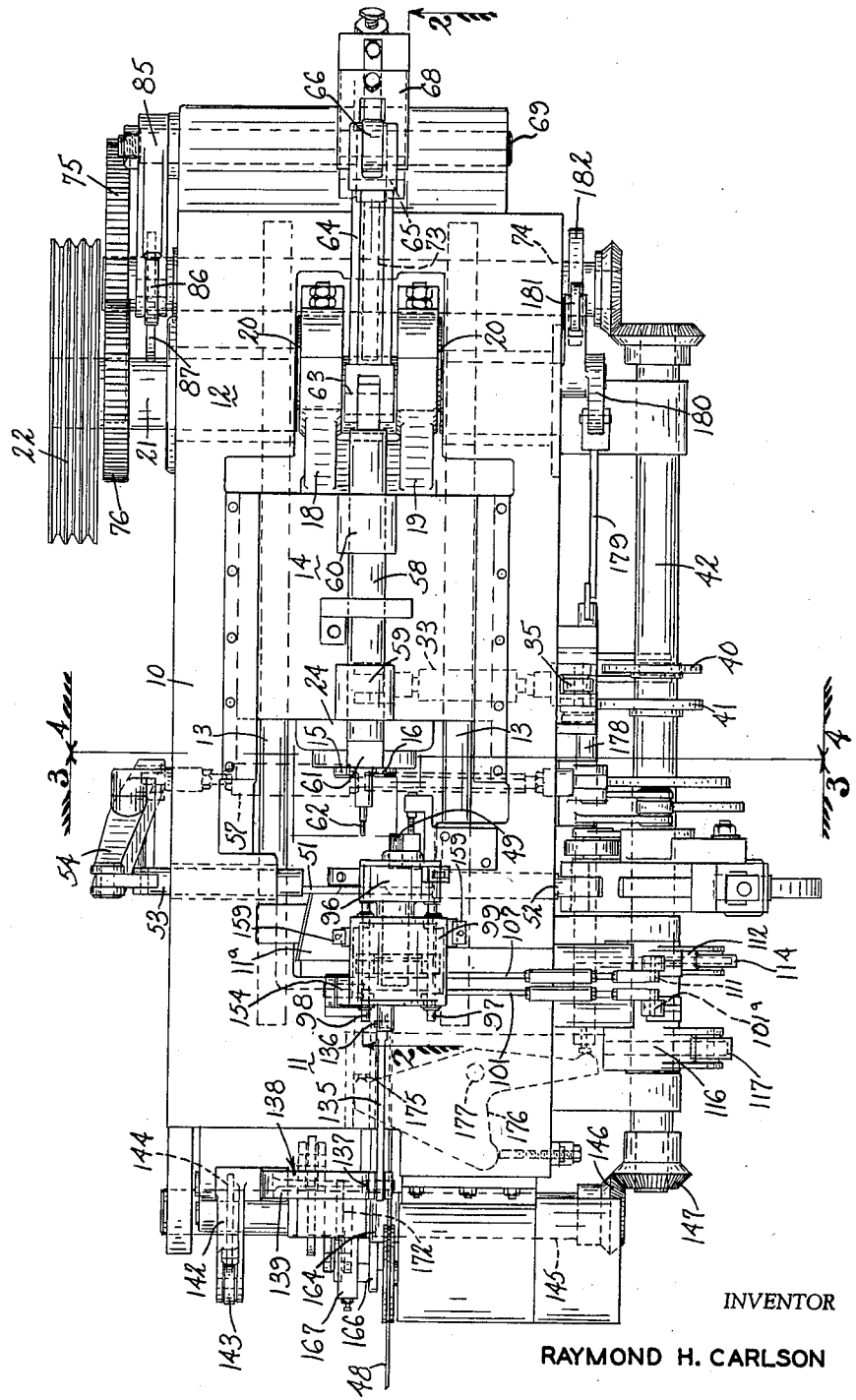
FIG. 1 is a top plan view of a header or upsetting machine embodying my invention.

At the rear end of the gate is a pivot rod 17 to which is pivotally connected a double pitman having rearwardly projecting arms 18 and 19 (FIGS. 1 and 2) rotatably embracing spaced crank portions 20 of a transversely extending shaft 21, this shaft being driven from any suitable means such as the pulley 22 (FIG. 1). It will be apparent that with this construction, when the shaft 21 is rotated, the gate will be reciprocated as is the usual case with heading machines now in use.

As illustrated, the heading operation may be performed in two stages as is usual in the well-known "two blow" header and, therefore, the two heading punches 15 and 16 cooperate with a single die to be later described. Provision is made, therefore, for shifting the heading punches on the gate in a direction transverse to the direction of travel of the gate. To this end the punches are mounted upon a punch carrier 24 slidably mounted upon the gate and secured to transverse rods 25 (FIGS. 2 and 3) by a bracket member 26. As shown in FIG. 2 this bracket member is provided with spaced ears 27 by which is carried a pin 28, and a slide 29 is mounted upon this pin.

The slide 29 is adapted to reciprocate longitudinally of the frame in a guide member 30 provided at the upper end of a rocker 31 pivoted at 32 to the frame (FIGS. 2 and 3). A link 33 is pivoted at 34 to this rocker member at one end and the other end of the link is pivoted to an upstanding lever 35 having arms 36 and 37 carrying cam follower rollers 38 and 39 to cooperate with cams 40 and 41 secured upon a side shaft 42, which cams will serve to reciprocate the link 33 and, therefore, shift the punches 15 and 16. As this punch shifter mechanism is not to be claimed in the present application, no further description thereof will be necessary but it may be stated that the shaft 42 is also driven by the main shaft 21 so that the cams 40 and 41 will be actuated in timed relation to the reciprocations of the gate.

Upon the die bed 11 is mounted a heading die 45 (FIGS. 2, 4 and 6), an impact or extruding die 46, and a cut-off die 47. The wire or rod stock indicated at 48 in FIG. 1 is fed through the cut-off die 47 by any well-known feed mechanism against a feed stop 49 in the usual manner (FIG. 4). A length of stock protrudes from the die and is cut off by cooperating cutters 50 and 51, these cutters being carried by the cutter slides 52 and 53 respectively, slidably mounted in the frame for movement transversely across the face of the die block.

The cutter slide 52 may be cam actuated in a well-known manner from the slide shaft 42 previously referred to and, as such mechanism is well known in the art, it is unnecessary that it be disclosed herein. The slide 53 is actuated by a lever 54 pivoted to the frame at 55 and having pivoted at 56 to its lower end a link 57 which also may be actuated by cam mechanism, not shown, carried by the shaft 42. It will be understood that in the usual manner of heading machines of this character such, for example, as shown in the Wilcox Patent No. 2,318,825, May 11, 1943, the two cutters grip the length of wire stock protruding from the cut-off die 47 and move transversely over to the impact die 46 carrying the workpiece thereto.

When the blank arrives at a point opposite the extruding die (FIG. 2), it is ejected from the cutters into the extruding die and processed therein by mechanism now to be described. While any suitable form of extruding die may be used in the machine, I prefer to use a die having a curved bottom as shown, for example, in the Gersman Patent No. 2,335,590. As shown in FIG. 9, the impact or extruding die is provided with a relatively small inner opening or cavity 46ª and an outer cavity 46ᵇ of larger diameter, the latter being provided with the curved bottom. This outer cavity is, throughout the greater part of the depth, of substantially the same diameter as the workpiece and of greater depth than the length of the workpiece so as to completely receive the latter and support it against lateral deformation through the period during which pressure is applied to it by the punch which closes the opening of the cavity.

After the blank has been ejected from the cutters, the latter recede to be ready for a further operation. Referring particularly to FIG. 2, a plunger 58 is slidably mounted in brackets 59 and 60 upon the gate and secured to the forward end of the plunger is a punch holder 61 which carries the extrusion punch 62 and secures the latter to the plunger. This plunger extends rearwardly between the arms 18 and 19 of the double pitman (FIG. 1) and to the rear end thereof are pivoted at 63 a pair of links 64. The rear ends of these links are pivoted at 65 to a lever 66 which is in turn pivoted at 67 to a lever 68 secured to a shaft 69 oscillatably mounted in the frame of the machine. A further lever 70 is pivoted at 71 to the lower end of the lever 68 and carries a roller 72 adapted to cooperate with a cam 73 carried by a transverse shaft 74. The shaft 74 is rotatably mounted in the frame and upon one end thereof is a gear 75 (FIG. 1) meshing with a gear 76 carried by the crank shaft 21. The gears 75 and 76 are so proportioned that the shaft 74 is driven at one half the speed of the shaft 21.

The lever 66 may be adjusted with respect to the lever 68 to adjust the position of the impact or extrusion punch 62. This adjustment may be effected by an adjusting screw 78 carried by an end portion 79 of the lever 66, which screw bears against a shoulder 80 of the lever 68, and a second screw 81 carried by the lever 68 and bearing against a shoulder 82 of the lever 66. A breaker plate 83 is secured to the lever 70 and in contact with this plate is the end of an adjustable screw 84 threadedly mounted in the lever 68. This breaker plate provides for the stopping of the action of the extrusion punch if an obstruction is encountered.

As shown in FIG. 1, a lever 85 is secured to the shaft 69, and at the other end of this lever is provided a roller 86 (FIG. 2) which is engaged by a cam 87 secured to the shaft 74. With this construction it will be seen that the cam 73 through the mechanism described actuates the plunger 58 and extrusion punch 62 in a forward direction or toward the left, as shown in FIG. 2, while the cam 87 and lever 85 effect the return motion of the punch to the right, as shown in this figure. As illustrated, the length of the stroke of the extrusion punch is greater than the stroke of the gate carrying the heading punches. As these two elements are actuated independently, the gate by the pitman 18, 19 and the extrusion punch by the cams 73 and 87, the difference in stroke is easily obtained by proper shaping of the cams.

When the extrusion punch 62 moves forwardly, it engages the workpiece then held by the cutters in front of the extrusion die 46 and ejects this workpiece into the die and by continued travel effects extrusion of the workpiece, thus reducing the cross-sectional size of the die end of the workpiece. Suitable knock-out mechanism to be described hereinafter is provided to eject the work piece from the extrusion die upon the retraction of the punch 62, the workpiece being ejected into transfer fingers of mechanism for carrying it to the heading die.

The transfer mechanism which serves to carry the workpiece from the extruding die 46 to the heading die 45 is shown more especially in FIGS. 5, 6 and 7 and 8. The transfer fingers which grip the blank are shown at 90 and 91 and are secured to the lower end of a finger holder 92. To the upper end of this holder is pivoted at 93 one end of an arm 94, the other end of which is keyed to a shaft 95 oscillatably mounted in an elongated bracket 96 (FIG. 8). This bracket furnishes a bearing for the shaft 95 and is in turn secured to rods 97 and 98 (FIG. 7) slidably mounted in the walls of a housing 99 through which the bracket 96 extends.

As shown in FIG. 8, the arm 94 is at one end of the shaft 95 and secured to the other end of the shaft is an arm 100 to the lower end of which (FIG. 7) is secured a link 101.

Pivoted at 102 to the intermediate part of the finger holder 92 is one end of a bent arm 103, the other end of which is pivoted to an arm 104 secured to a shaft 105 rockably mounted in the bracket 96 (FIG. 8). To the other end of the shaft 105 is secured an arm 106, to the end of which is secured a link 107 (FIG. 7). Integrally formed with the arm 104 is a stop arm 108 (FIG. 6) designed to contact stop screws 109 and 110 threadedly mounted in the bracket 96.

As shown more especially in FIG. 4, the link 107 is adjustably connected at 111 to an upstanding lever 112 pivoted on a pivot pin 113 mounted in the frame of the machine. At its lower end the lever 112 carries a cam follower roller 114 adapted to engage the cam 115 so that the lever is actuated thereby. The cam 115 is mounted on the shaft 42.

Likewise the link 101 is similarly adjustably secured at 101ª to a lever 116 also pivoted on the pivot pin 113, and the lower end of the lever 116 carries a cam follower roller 117 for engagement with the cam 118 also secured to the shaft 42. The cam followers 114 and 117 are held against the cams 115 and 118 respectively by spring-pressed plungers 120 slidably mounted in housings 121 and urged outwardly by springs 122. It will be understood that while only one of these spring-pressed plungers is shown in FIG. 4, the other stands directly behind it, there being one of these return plungers provided for each of the levers 112 and 116.

With the above construction is will be seen that when the machine is in operation and the shaft 42 rotated, the cam 118 will move the lever 116 in a clockwise direction, as shown in FIG. 4, which through the link 101 and the lever 100 will rotate the shaft 95 in a counterclockwise direction, and thus raise the finger holder 92 over the dotted-line path 125 (FIG. 6) from a position opposite the opening in the die 45 to the position shown in this figure. The return movement of the finger holder 92 over this path will be effected by the associated plunger 120. The cam 115 will urge the lever 112 in a clockwise direction, as shown in FIG. 4, which through the link 107 and lever 106 will rotate the shaft 105 in a counterclockwise direction, thus moving the lower end of the finger holder 92 outwardly or to the right, as shown in FIG. 6, about the pivot 93. This movement will be from the dotted-line to the full-line position shown in this figure. The return movement of the fingers from the full-line to the dotted-line position shown in FIG. 6 will be effected by the associated spring-pressed plunger 120.

In order that the fingers 91 correctly register with the opening in the die 45, a stop screw 126 is threadedly mounted in a lug 127 carried by the arm 94, and the lower end of this screw is adapted to abut a stop member 128 on the bracket 96 in the position of the parts shown in FIG. 4. As the finger holder 92 is moved downwardly to this position by the spring-pressed plunger 120, a positive stop can thus be provided to effect proper registration of the fingers with the opening in the die. It will be seen from FIG. 6 that the arm 103 which moves the finger holder 92 laterally is stopped positively in both directions by the stop screws 109 and 110 and, while the spring-pressed plunger 120 associated with the lever arm 112 will allow positive stopping of the arm 103 in one direction, it is desirable to provide means permitting this action when the arm is moved in the opposite direction. For this purpose a hollow coupling 129 (FIG. 4) is provided between the link 107 and the connection 111 with the lever 112, and a rod 130 connected to the lever 112 is slidably received in this housing and held therein by a gland nut 131. This rod is provided with a shoulder 132 which compresses a spring 133 between it and a shoulder 134 in the housing when the rod 130 is moved to the right, as shown in this figure. Thus, when the arm 103 is positively stopped by the stop screw 110, the compression of the spring would allow additional travel of the lever 112.

It will be seen from FIG. 9 of the drawings that the face of the heading die 45 stands somewhat forwardly of the extruding die in order to give the transfer fingers an opportunity to transfer the work from the latter to the former and at the same time permit the cutters to enter behind the fingers and perform their work during the transfer operations. Also, as shown in this figure, when a blank has been extruded in the extruding die, it will be provided with a shank portion B' and a larger outer portion B², which latter portion is gripped by the fingers 90 adjacent the face of the die upon ejection of the blank from the die. In order for the transfer fingers to carry the blank to the heading die 45, it is necessary, therefore, for them to move outwardly so that the shank portion B' will clear the dies and permit this transfer. It is then desirable, when the transfer fingers reach the dotted-line position shown in FIG. 9 and present the blank to the heading die 45, that the fingers move inwardly so as to insert the blank into the cavity of the heading die to an extent that the blank or workpiece will be firmly held in place to receive the impact of the heading punch.

The outer portion of the cavity in this die is substantially the same diameter as the unextruded portion of the blank so as to receive a part of this portion. The transfer fingers can then be disengaged from the blank to begin their return movement before the blank is engaged by the heading punch so as not to be in the way of the latter. Therefore, it is desirable that the transfer fingers move to and from the face of the dies as well as to move in a generally vertical direction from one die to the other.

It is for this reason that the transfer mechanism is secured to the rods 97 and 98 which in turn are slidably mounted in the housing 99. In order to effect movement of the transfer mechanism longitudinally of the machine, the rear end of a link 135 is pivoted at 136 (FIGS. 5 and 8) to the bracket 96. The forward end of this link is pivoted at 137 to a bell crank lever 138. This lever has a horizontally extending portion 139 and a downwardly extending portion 140 pivoted at 141 to the bed or frame of the machine. The lower end 142 of the lever 138 below the pivot pin 141 is provided with a cam follower roller 143 engaging a cam 144 secured to a front shaft 145 driven from the shaft 42 (FIG. 1) by bevel gears 146 and 147.

With this construction it will be seen that the rotation of shaft 145 will serve to move the transfer mechanism to the right or away from the dies, as shown in FIG. 5, or toward the observer, as shown in FIG. 6. The return movement of the transfer mechanism toward the dies is effected by a spring-pressed plunger 148 mounted in a housing 149 and urged outwardly by the spring 150 against a stop screw 151 in the portion 140 of the lever 138.

In order to permit movement of the bracket member 96 to effect this in-and-out movement of the transfer mechanism, the link 101 is connected to the arm 100 by a swivel joint 152 (FIG. 8) and likewise the link 107 is connected to the arm 106 by a smiliar swivel joint 153. Similarly the connections 101ª and 111 of the other ends of the links 101 and 107 are also swivel joints so that movement of the bracket will not break or strain the connections of the links with the transfer mechanism.

It is also desirable for the transfer mechanism to be swung to an inoperative position where it is accessible for adjustment, leaving intact the connections between this mechanism and the links 101 and 107 so that the finger holder 92 and fingers attached thereto can be operated over a range of movements corresponding to the die positions and proper adjustments made to effect registration of the fingers with the dies. To this end the transfer mechanism may be swung from its full-line operative position, shown in FIG. 5, to the dotted-line position shown in this figure about an axis extending transversely of the bed of the machine. In this position of the parts a template having the die positions therein may be employed and the fingers moved by operation of the machine to determine whether or not the transfer mechanism is in proper adjustment.

To permit this movement of the transfer mechanism the housing 99 in which the mechanism is mounted is provided with a collar 154 (FIG. 7) pivoted upon a pin 155 extending transversely of the bed of the machine and carried by spaced arms 156 and 157 of a bracket on the die block so that this housing which carries the supporting bracket 96 may swing about the axis of the pin 155 to the dotted-line position shown in FIG. 5.

As shown in FIG. 6, clamp members 159 are adjustably secured to the bed by clamp screws 160 passing through enlarged openings 161 in the clamp members and threaded into a part on the die bed. Lugs 162 are provided, one on each side of the housing 99, over which the clamp members engage in their operative positions shown in this figure. Thus the housing 99 is secured in its operative position but, when the screws 160 have been backed off, the clamp members may be moved to release the lugs 162 and thus permit the housing to be swung about the axis of the pin 155 to its inoperative or adjusting position shown in dotted lines in FIG. 5.

At this time, as shown in this figure, the link 135 is disconnected at its pivot point 136 from the supporting bracket 96 as the in-and-out movements of the transfer mechanism toward and away from the die block are not required for this adjustment. This swinging movement of the transfer mechanism without disturbing the connection of the links 101 and 107 with the arms 100 and 106 respectively is permitted by reason of the swivel joints 152 and 153 at the transfer ends of the links and the similar swivel joints at the other end of the links with the arms 112 and 116.

Figure 10:
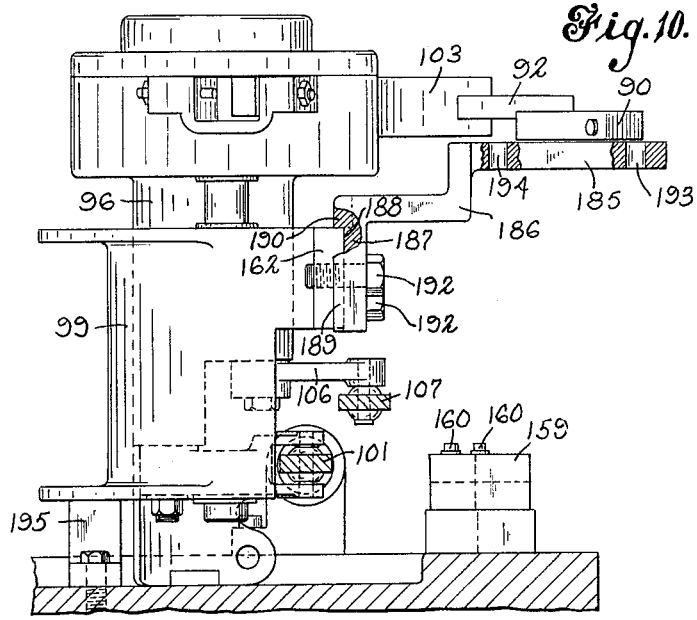
FIG. 10 is an elevational view of the transfer mechanism when swung to its inoperative position above the die bed.
Figure 11:
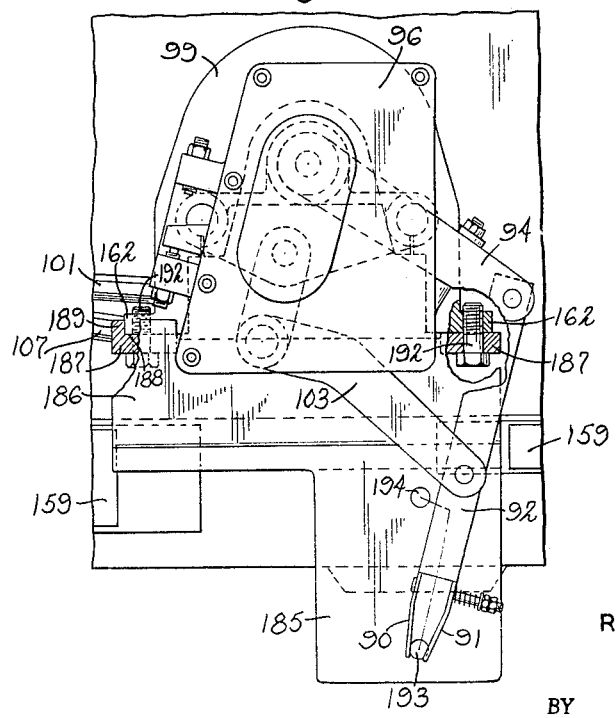
FIG. 11 is a top plan view of the parts shown in FIG. 10.

The position of the parts of the transfer mechanism when swung to this inoperative position is shown in FIGS. 10 and 11. A template 185 may be secured in operative relation to the transfer fingers 91, this template being of the form shown in FIG. 11. It is provided with a bracket 186 having depending portions 187 to abut against the lower faces 188 of the lugs 162 previously described, which lugs are a part of the housing 99. These depending portions also have flanges 189 to abut the outer edges of the lugs 162 and shoulders 190 abutting the front faces of these lugs. A screw 192 may be passed through the depending portions 189 to secure the template to the housing. The template will be provided with die stations shown at 193 and 194, the spacing of which is the same as the dies 45 and 46 of the apparatus. Thus the template can be supported in proper position with respect to the transfer mechanism while maintaining the operative connections to the latter so that the fingers may be operated and it can be observed whether or not they properly register with the die stations 193 and 194 on the template. It will be obvious that this will facilitate the adjustment of the transfer mechanism as the proper registration of the fingers with the die stations can be observed on the template much more easily than on the face of the die bed.

When the transfer mechanism is swung upwardly to the position shown in FIG. 10, the housing 99 may rest upon a post 195 secured upon the die bed so as to hold it in its proper vertical position. It will, of course, be understood that the template will be removed before restoring the transfer mechanism to its operative position after proper adjustments have been made.

Suitable means are provided for ejecting the blanks from both the extruding die 46 and the heading die 45. As shown in dotted lines in FIG. 5, an ejecting punch 163 is slidably mounted in the frame of the machine and actuated by a knock-out rod 164. This rod is in turn actuated by an arm 165 secured to a lever 166 pivoted upon the pin or shaft 141. The lever 166 is connected to a second lever 167 by a link 168, this connection being adjustable by the mechanism shown at 169 so as to adjust the stroke of the knock-out rod 164. The lever 167 is pivoted on the frame and carries cam follower rollers 170 and 171 adapted to engage the cam 172 secured to the front shaft 145. It will be remembered that this is the same shaft that actuates the cam 144 which effects the in-and-out movement of the transfer mechanism and is in turn actuated from the side shaft 42 and the rear shaft 74, which latter shaft is rotated at half the speed of the shaft 21.

To eject the work from the heading die, a knock-out rod 175 is slidably mounted in the bed of the machine (FIG. 5), this rod being actuated by a lever 176 (FIG. 1) pivoted to the bed at 177. The other end of this lever is actuated by a longitudinally extending rod 178 slidably mounted in the frame and connected by a link 179 to a bell crank lever 180 pivoted on the frame. The other arm of this lever carries a cam follower roller 181 which is engaged by a cam 182 on the rear shaft 74.

Figure 12:
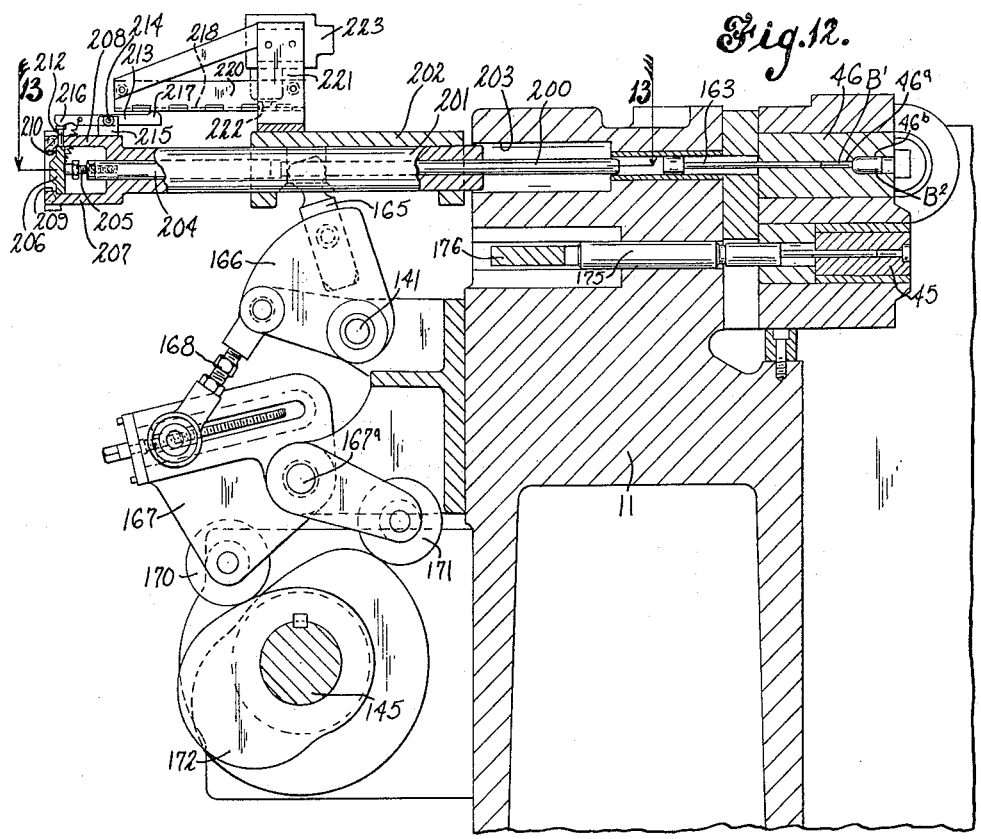
FIG. 12 is a partial sectional view similar to FIG. 5 but showing a safety mechanism for the ejecting punch of the extruding die.
Figure 13:
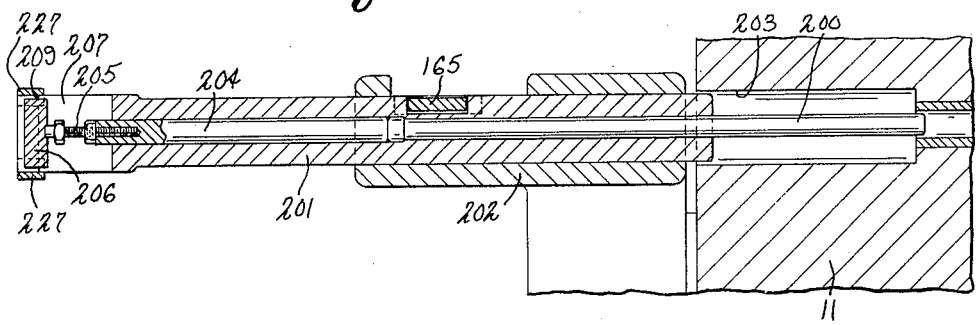
FIG. 13 is a sectional view on line 13—13 of FIG. 12.

In FIGS. 12 to 15 of the drawings there is shown a safety mechanism for the punch which serves to eject the blank from the extruding die. As shown in FIG. 12, the ejecting punch 163 is adapted to be engaged by a knock-out rod 200 slidably mounted in the frame and also slidable within an actuating sleeve 201 which in turn is slidably mounted in a bracket 202 fixed on the frame. The forward end of this actuating sleeve is movable into and out of a chamber 203 formed in the frame 11.

A rod member 204 is also slidably mounted within the actuator 201 and an adjusting screw 205 threaded into the end of this member is adapted to be engaged by a breaker plate 206. This breaker plate is a member of frangible material and is held between the arms 207 and 208 of the bifurcated end of the actuating sleeve 201 by shoulders 209 and 210 on these arms.

The actuating sleeve 201 is moved by an arm 165 secured to the lever 166 pivoted on the frame 11 at 141. This lever is connected by a link 168 to a second lever 167 pivoted on the frame at 167ª. This second lever carries the cam following rollers 170 and 171 engageable with the cam 172 mounted on the shaft 145. This mechanism for moving the actuator sleeve 201 is largely the same as that previously described and hence the same numerals are employed.

With the above construction it will be seen that upon rotation of the shaft 145 the actuating sleeve 201 will be reciprocated and through the breaker plate 206 will drive forward the member 204 and the knock-out rod 200 which engages the ejecting punch 163 to eject the blank from the die 46. However, when the ejecting punch 163 meets excessive resistance as is sometimes the case, the frangible breaker plate 206 will give way and will thereby disable the ejecting mechanism and avoid breaking of the ejecting punch 163 or other mechanism.

It is also desirable not only to interrupt the movement of the ejecting mechanism but also to stop the machine if the work cannot be ejected from the die. To this end a pin 212 is slidably mounted in the arm 208 of the actuating member and is supported upon the upper edge of the breaker plate 206. A lever 213 is pivoted at 214 upon a bracket 215 secured to the arm 208 and one end of this lever 216 bears upon the pin 212. The other end 217 of this lever is slidably engaged with the lower surface of a plate 218 (FIG. 14) hinged at 219 to an arm 220 secured to a bracket 221 carried by the bracket 202.

The upper surface of the plate 218 is adapted to engage the plunger 222 of a switch mechanism 223 of any usual form. This switch mechanism is adapted to control the driving motor of the header and also control the clutch which transmits power from the motor to the pulley 22 and also to a brake which serves to stop the machine. It may here be noted that the plate 218 is hinged to a fixed part of the machine while the actuator sleeve 201 normally moves with the knock-out rod or punch 200. It is, therefore, necessary to have a sliding connection between the end 217 of the lever 213 so as to provide for movement of the plate 218 in any position of the actuating sleeve.

One end of a spring 224 is connected at 225 to the lever 213 while the other end is connected at 226 to one of a pair of brackets 227 embracing the arms of the bifurcated end of the actuating sleeve 201 (FIG. 14). This spring urges the lever 213 in a counterclockwise direction, as shown in FIG. 12, against the pin 212 which bears upon the upper edge of breaker plate 206. With this construction it will be apparent that if the ejecting punch meets with sufficient resistance to break out the frangible breaker plate 206 and disable the ejecting mechanism, the pin 212 will drop downwardly and the lever 213 will be rotated in a counterclockwise direction by the spring 224, thus raising the plate 218 upwardly and opening the switch mechanism 223 to cut off power to the machine, disengage the clutch and apply the brake.

While I have shown and described a preferred embodiment of my invention, it will be understood that it is not to be limited to all of the details shown, but is capable of modification and variation within the spirit of the invention and within the scope of the claims.

What I claim is:

1. A header having a cut-off station through which a length of stock is fed, an extruding die station adjacent the cut-off station, cutter mechanism to sever a workpiece from said stock and carry it to the extruding station, an extruding punch, means for actuating said punch to eject the workpiece from the cutter mechanism into said extruding die station and to effect partial extrusion of said workpiece therein, a heading die and cooperating heading punch, means to transfer the workpiece from the extruding die station to said heading die, and means to actuate the extruding punch independently of and in timed relation with the heading punch.

2. A header or like apparatus having an extruding die, a cooperating extruding punch, means for presenting a workpiece to the extruding die for operation thereon by the extruding punch, means for ejecting the workpiece from said die, a heading die, means for transferring the workpiece from the extruding die to the heading die, a reciprocable gate having a plurality of punches thereon to cooperate with the heading die, means to actuate the extruding punch, and means to actuate the gate a plurality of times for each actuation of the extruding punch.

3. A header or like apparatus as in claim 2 wherein the means for actuating the gate comprises a crank shaft, a double-armed pitman connecting said gate to the shaft and wherein said extruding punch is carried by a plunger mounted between the arms of said pitman.

4. A header or like apparatus as in claim 2 wherein is provided a rotatable crank shaft to actuate the gate, an auxiliary shaft to actuate the extruding punch, and means for driving said auxiliary shaft from the main shaft at one-half the speed of the latter.

5. A header or like apparatus as in claim 2 wherein is provided a rotatable crank shaft for actuating the gate, an auxiliary shaft driven from the main shaft, and cam means on the auxiliary shaft for actuating the extruding punch.

6. A header or like apparatus having a frame and a plurality of work stations thereon, said stations comprising a cut-off station, an extruding die and a heading station having a heading die, severing means, means for actuating said severing means to sever a workpiece from a length of stock at the cut-off station and for carrying it to said extruding die, an extruding punch for ejecting the workpiece from the severing means and for extruding it in the extruding die, means for ejecting the workpiece from the extruding die, transfer means for carrying the workpiece to the heading station, a reciprocable gate having a heading punch thereon for cooperating with the heading die to head the workpiece, means for actuating said heading punch, and means for actuating said extruding punch independently of the heading punch and in timed relation therewith.

7. A combined extruding and heading machine for metal blanks, said device having a die bed provided with an extruding die and a heading die, a reciprocating gate having a pair of heading punches thereon for cooperating with the heading die, an impact plunger carrying a punch for cooperating with the extruding die, means for reciprocating the impact plunger, and means for reciprocating the gate a plurality of times for each reciprocation of the impact plunger.

8. A combined extruding and heading machine for metal blanks, said device having a die bed provided with an extruding die and a heading die, a reciprocating gate having a pair of heading punches thereon for cooperating with the heading die, an impact plunger carrying a punch for cooperating with the extruding die, means for reciprocating the impact plunger, and means for reciprocating the gate a plurality of times for each reciprocation of the impact plunger, said plunger being slidably supported upon the gate.

9. A header or like apparatus comprising a frame, means thereon for cutting a workpiece from a length of stock, means on the frame including an extruding die and cooperating punch for extruding a portion of the workpiece to reduce the cross-sectional size of said portion with respect to the unextruded portion thereof and form a relatively small shank, a heading die and cooperating heading punch on the frame, means for transferring the workpiece to the heading die, and means for thereafter actuating the heading punch to upset the unreduced portion of the workpiece and means interconnecting said last mentioned means and said extruding punch whereby said two punches are actuated into workpiece engaging positions at different intervals.

10. A header comprising a frame, means on the frame including a first die and a cooperating punch for modifying the shape of a workpiece preparatory to heading, a heading die, means for transferring said modified workpiece and placing it into said heading die, a gate reciprocably mounted on said frame having a pair of punches shiftably mounted thereon to cooperate with said heading die, means for shifting said heading punches on said gate during the reciprocation thereof to effect registration of first one and then the other of said last named punches with said heading die, means for reciprocating said first named punch independently of but in timed relation with said gate, and means for reciprocating said gate to drive said heading punches each into engagement with the workpiece in said heading die during each reciprocation of said first named punch into and out of engagement with said workpiece in said first die.

11. A header or like apparatus having a frame and a plurality of work stations thereon, said stations comprising a cut-off station, an extruding station having an extruding die with a workpiece receiving cavity having a depth of the order of the length of the workpiece, and a heading station having a heading die, a die bed in which said dies are mounted, severing means for severing a workpiece from a length of stock at the cut-off station and for carrying it to the extruding station, an extruding punch for ejecting the workpiece from the severing means and for extruding it in the extruding die, means for ejecting the workpiece from the extruding die, transfer mechanism for transferring the workpiece to the heading station, a reciprocable gate having a heading punch thereon for cooperating with the heading die to head the workpiece, means for actuating said heading punch, means for actuating said extruding punch independently of the heading punch, means for actuating said transfer mechanism in a plane generally parallel to the face of the die bed to effect the transfer to the heading station, and means for moving said transfer mechanism toward and from the face of the die bed for facilitating withdrawal of the workpiece from said extruding die and insertion thereof into said heading die.

12. A header or like apparatus having a frame and a plurality of work stations thereon, said stations comprising a cut-off station, an extruding station including an extruding die with a workpiece receiving cavity having a length greater than the length of the workpiece and a heading station having a heading die, a die bed in which said dies are mounted, severing means for severing a workpiece from a length of stock at the cut-off station and carry it to the extruding station, an extruding punch for ejecting the workpiece from the severing means and extrude it in the extruding die, means for ejecting the workpiece from the extruding die, transfer means for transferring the workpiece from the extruding die to the heading station, means for actuating said transfer mechanism in a plane generally parallel to the face of the die bed to effect the transfer of the workpiece to the heading station, and means for moving said transfer mechanism toward the face of the die bed for inserting the workpiece into said heading die.

13. A header or like apparatus having a frame and a plurality of work stations thereon, said stations comprising a cut-off station, an extruding station including an extruding die with a workpiece receiving cavity having a length greater than the length of the workpiece, and a heading station having a heading die, a die bed in which said dies are mounted, severing means for severing a workpiece from a length of stock at the cut-off station and carrying it to the extruding station, an extruding punch for ejecting the workpiece from the severing means and for extruding a portion of said workpiece in the extruding die, means for ejecting the workpiece from the extruding die, transfer means for transferring the workpiece from the extruding die to the heading station, said transfer means arranged for gripping the head of the partially extruded workpiece adjacent the face of the die bed and for then moving outwardly from said die bed with said workpiece to clear the latter from said extruding die cavity, means for actuating said transfer mechanism in a plane generally parallel to the face of the die bed for effecting the transfer of said workpiece to the heading station, and means for moving said transfer mechanism toward the face of the die bed for inserting the workpiece into said heading die.

14. A header or like apparatus for the working of a metal blank to reshape the same, comprising:
 a pair of dies for holding said blank in successive stages of working thereof,
 means to transfer said blank from one of said dies to the other,
 a pair of punches one for each of said dies for striking said blank when in the corresponding die,
 and non-identical punch actuating mechanisms operatively connected one to each of said two punches, the arrangement being such that during their operative strokes the two punches may be driven in a different manner and independently of one another.

References Cited in the file of this patent

UNITED STATES PATENTS

| | | |
|---|---|---|
| 45,116 | Brayton | Nov. 15, 1864 |
| 1,292,892 | Hosford | Jan. 28, 1919 |
| 1,885,288 | Pracny | Nov. 1, 1932 |
| 2,401,805 | Wilcox | June 11, 1946 |
| 2,542,864 | Friedman | Feb. 20, 1951 |
| 2,680,860 | Friedman | June 15, 1954 |
| 2,689,359 | Friedman | Sept. 21, 1954 |
| 2,758,322 | Schaefer | Aug. 14, 1956 |
| 2,825,075 | De Loe | Mar. 4, 1958 |
| 2,867,823 | Louis et al. | Jan. 13, 1959 |
| 2,891,263 | Hoyt et al. | June 23, 1959 |